(12) United States Patent  
Shim et al.

(10) Patent No.: US 6,708,021 B1  
(45) Date of Patent: Mar. 16, 2004

(54) RADIOTELEPHONE FORMAT

(75) Inventors: Jae H. Shim, San Jose, CA (US);  
Ilwhan Park, Pleasanton, CA (US)

(73) Assignee: Mobigence, Inc., San Jose, CA (US)

( * ) Notice: Subject to any disclaimer, the term of this patent is extended or adjusted under 35 U.S.C. 154(b) by 223 days.

(21) Appl. No.: 09/643,152

(22) Filed: Aug. 21, 2000

(51) Int. Cl.⁷ .............................. H04B 1/38
(52) U.S. Cl. .................... 455/90; 455/575; 455/550
(58) Field of Search .................. 455/575, 550, 455/572, 90, 566, 569, 573, 336; 345/173, 137, 169

(56) References Cited

U.S. PATENT DOCUMENTS

| | | | | |
|---|---|---|---|---|
| 4,611,202 A | * | 9/1986 | DiNitto et al. ................. | 345/28 |
| 5,140,138 A | * | 8/1992 | Tanaka ....................... | 235/1 D |
| 5,422,656 A | * | 6/1995 | Allard et al. ................. | 345/173 |
| 5,610,971 A | * | 3/1997 | Vandivier .................... | 455/569 |
| 5,832,371 A | * | 11/1998 | Thornton .................... | 455/90 |
| 6,023,147 A | * | 2/2000 | Cargin, Jr. et al. ......... | 320/114 |
| 6,047,196 A | * | 4/2000 | Makela et al. .............. | 455/556 |
| 6,243,080 B1 | * | 6/2001 | Molne ........................ | 345/173 |
| 6,243,595 B1 | * | 6/2001 | Lee et al. ................... | 455/566 |
| 6,246,862 B1 | * | 6/2001 | Grivas et al. ................ | 455/90 |
| 6,349,040 B2 | * | 2/2002 | Lefort ........................ | 361/814 |

FOREIGN PATENT DOCUMENTS

EP 0344988 * 5/1989

* cited by examiner

Primary Examiner—Joy K. Contee  
(74) Attorney, Agent, or Firm—John F. Schipper (57) ABSTRACT

A radiotelephone and associated housing that is configured for more convenient use by providing a larger display screen (e.g., an LCD) for the radiotelephone user. A keypad and a display screen are placed on a first housing surface. A microphone and a speaker are spaced apart on a second housing surface. A touch sensitive pad is optionally provided on the first surface, for supplemental entry of data, commands and/or graphics. A battery or battery pack, optionally detachable from the housing, is provided adjacent to the microphone or adjacent to the speaker.

10 Claims, 12 Drawing Sheets

RADIOTELEPHONE FORMAT

FIELD OF THE INVENTION

This invention relates to an arrangement of mechanical, electromechanical and electronic components for more convenient use of a radiotelephone.

BACKGROUND OF THE INVENTION

Figure 1:
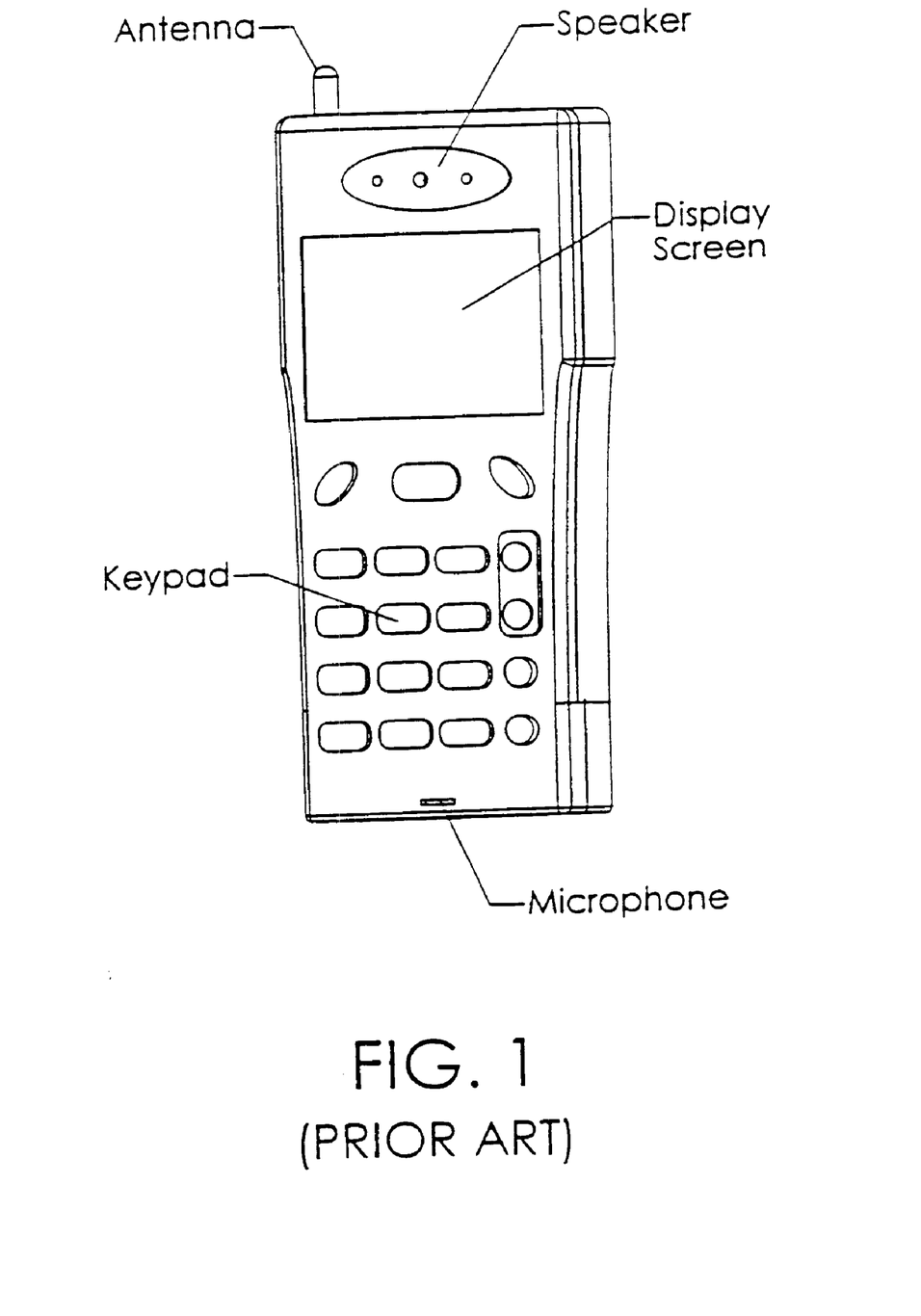
FIGS. 1 and 2 illustrate a conventional radiotelephone component arrangement.

Conventional portable, handheld radiotelephones are provided with a speaker or other audio signal output device ("speaker"), an LCD or other display for relevant radiotelephone information, a keypad or other data/command entry device ("keypad") to enter a telephone number for another telephone to be contacted (including, but not limited to, another radiotelephone), and a microphone or other audio signal input device ("microphone"), arranged in that order, all on one face of the radiotelephone housing, as illustrated in FIG. 1.

Figure 2:
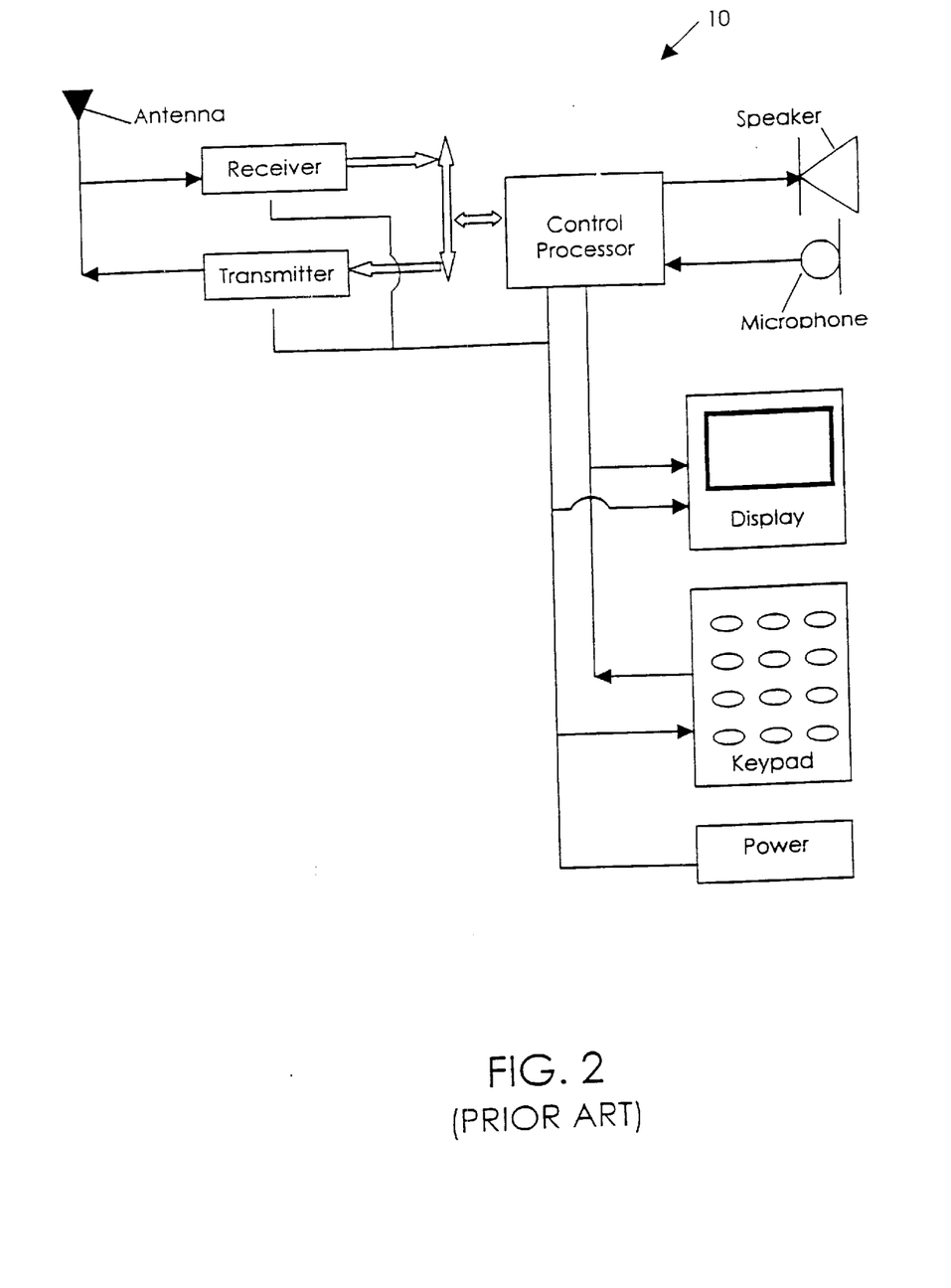

FIG. 2 is a schematic view of a radiotelephone 10 powered by a battery or other power source. The radiotelephone 10 includes an a signal receiver for audio and/or data signals, connected to an antenna, to receive signals from an audio signal source and/or a data signal source, spaced apart from the radiotelephone, and a signal transmitter, also connected to the, antenna, to transmit audio and/or data signals to an intended recipient. The radiotelephone 10 includes a display sub-system, to display alphanumeric text (usually 2–7 lines) including telephone numbers, and a keypad with alphanumeric keys to enter a called party's telephone number. The radiotelephone 10 includes a control processor, optionally including a memory unit, to control the processing of audio and/or data signals received from or to be sent to the antenna. The radiotelephone 10 also includes a speaker and a microphone whose signals are also processed by the control processor. A portable radiotelephone also includes a battery or other source of electrical power for the other components.

Development of various wireless technologies has led to convergence of conventional cellphones, PCS cellphones and wireless information access devices (wireless PDAs, two-way pagers, etc.) and other radiotelephones toward a single platform having a form factor that is comparable in size to a conventional cellphone. These devices often combine functions for two-way audio, calendar, address book, memoranda, e-mail, Web browsing, and other similar activities. However, substantially all of these devices have a conventional arrangement for speaker, LCD, keypad and microphone. This arrangement does not provide an adequate display area, when working with text-intensive applications involving editing a personal calendar, processing received e-mail messages. composing e-mail messages and memoranda, consulting or adding to an address book, and similar activities requiring intensive use of a display for input as well as for output.

Where an effort has been made to provide a larger LCD, the length and/or thickness of the resulting portable communication device often increases to a point where the device cannot easily be held in the hand or be conveniently carried in a pocket. It would be desirable to increase the size of the display of a portable radiotelephone, in order to accommodate the growing importance of text-intensive functions, without increasing the overall length of the device.

What is needed is a portable wireless communication device that serves as a radiotelephone and that provides a larger display region on the device housing. Preferably, this device should provide a touch sensitive pad or screen for data and/or command entry that is associated with the display region. Preferably, the battery, battery pack or other device power source (referred to collectively as a "battery") should be located near the speaker or microphone and should be oriented to minimize the thickness of the device.

SUMMARY OF THE INVENTION

These needs are met by the invention, which provides a new format for the mechanical, electromechanical and/or electronic components on and within a housing for a handheld radiotelephone device, referred to herein as a "radiotelephone," so that the device, as reconfigured, becomes comparable in size as well as thickness to a conventional radiotelephone. An alphanumeric display (e.g., an LCD) and a keypad appear on a first surface of the housing, and a speaker and a microphone appear on a second surface of the housing. Optionally, the first surface includes a touchpad where data, commands and graphics items can be entered by the radiotelephone user. This arrangement allows relatively more room for the display screen than is available in a conventional radiotelephone. Optionally, part or all of the display screen operates in a pressure sensitive mode for entry of data and commands into the device. Optionally, one or both of the sections at each end of the housing that contain the speaker and the microphone can be modified to accommodate these components, to accommodate one or more batteries for the radiotelephone, or for other purposes. The overall size and/or silhouette shape of a conventional handheld radiotelephone is maintained.

DESCRIPTION OF BEST MODES OF THE INVENTION

Figure 3:
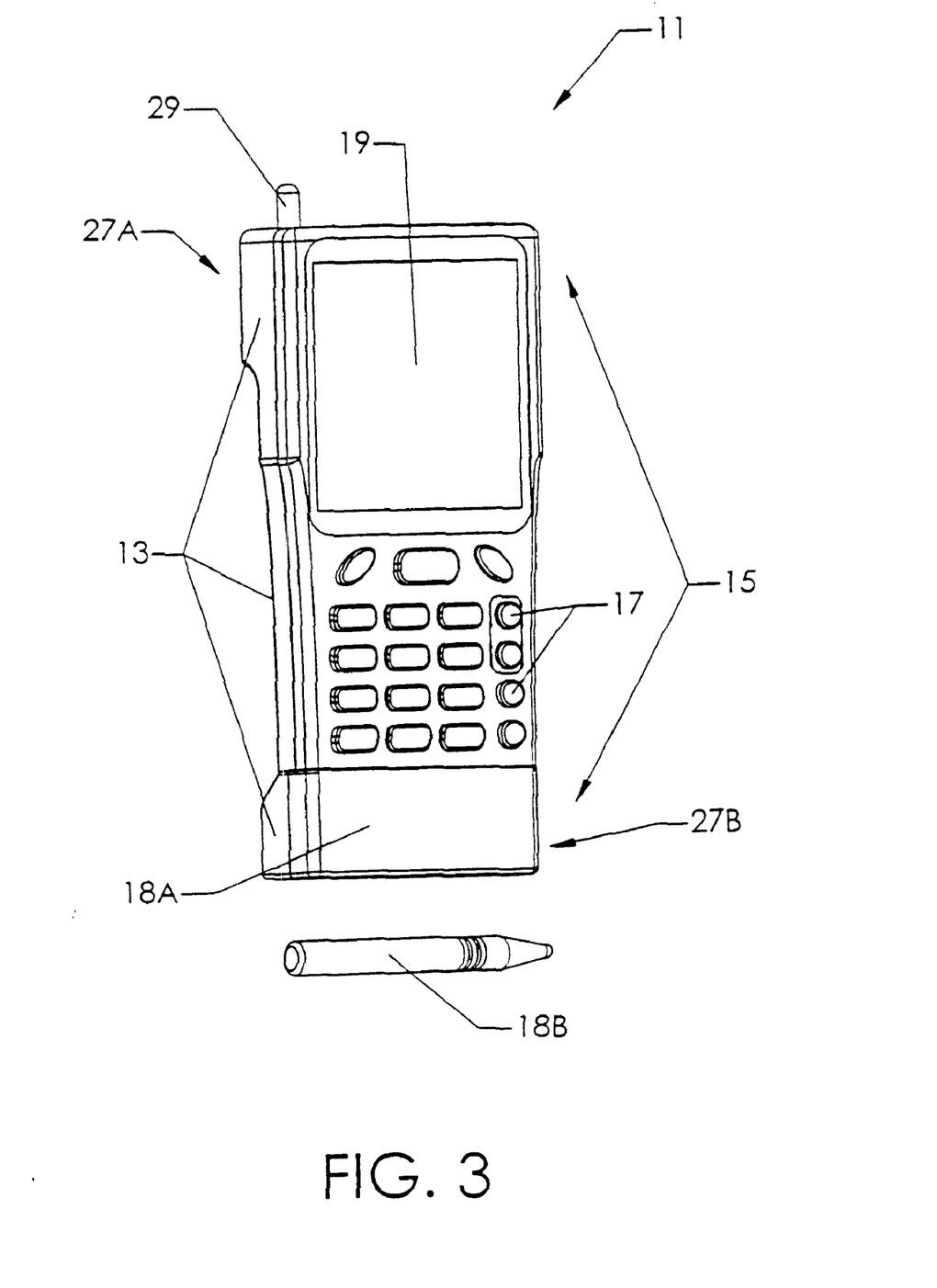
FIGS. 3 and 4 illustrate a first face and a second face, respectively, of a radiotelephone device housing configured according to the invention.
Figure 4:
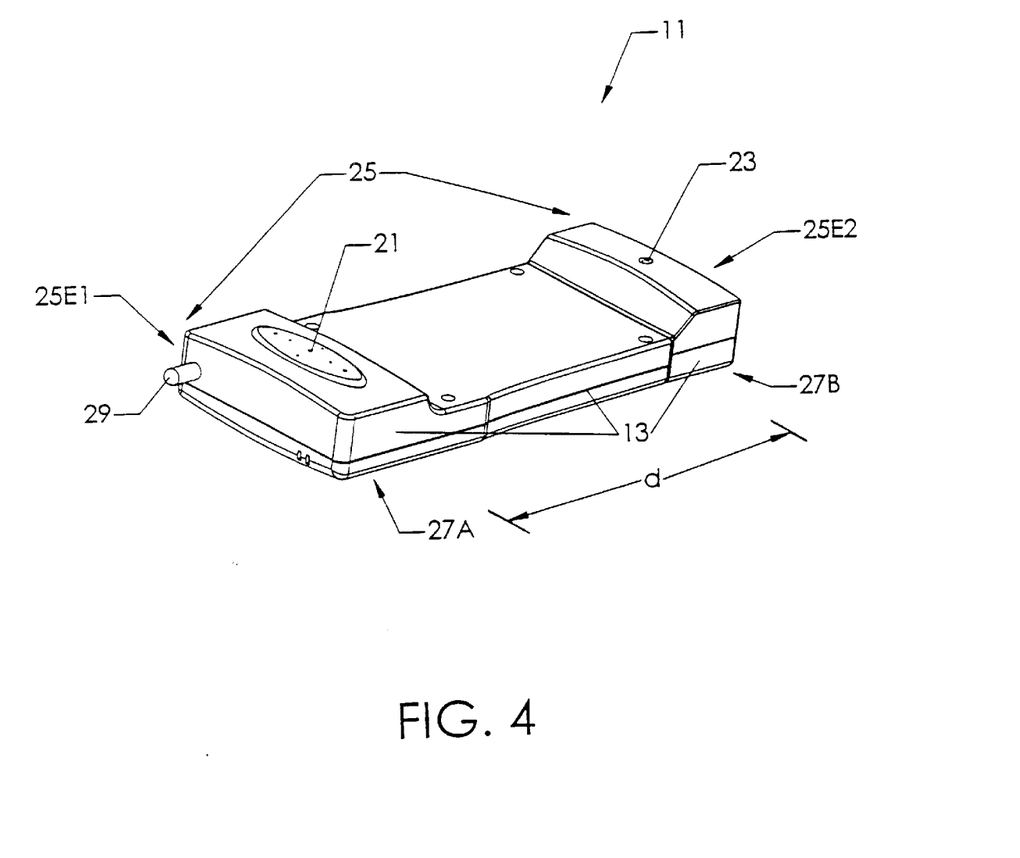

FIGS. 3 and 4 illustrate one embodiment of a radiotelephone device 11 configured according to the invention. A keypad 17 and display screen 19 appear on a first surface 15 of a housing 13, as shown in FIG. 3. A speaker 21 and a microphone 23 appear on a second surface 25 of the housing 13, as shown in FIG. 4. The radiotelephone includes a radio antenna 29, which may be exposed or may be a patch antenna and can be located at any convenient place on a housing surface. The first and second surfaces, 15 and 25, of the housing may be opposed surfaces on the housing. Preferably, a region 27A adjacent to the speaker and/or a region 27B adjacent to the microphone holds batteries or other electrical power sources.

The keypad 17, shown in FIG. 3, preferably includes a numerical pad, having entry keys for the numerals 0, 1, 2, . . . , 9, plus entry keys for other desired characters, plus entry keys for radiotelephone transmit channel, for receive channel and for radiotelephone off/on control. Optionally, the radiotelephone also has entry or activation keys for programming, for memory recall and/or for redial. The key pad 17 has whatever number of control keys and/or function keys is needed to perform its desired functions for input of data and/or commands. Optionally, the keypad 17 includes a key that toggles selected keys between two or more modes of operation, in order to increase the number of characters that can be entered into the device and/or to decrease the number of keys needed for such entry. Optionally, one of these modes of operation includes a display mode in which part or all of the display screen 19 becomes pressure sensitive for entry of data and/or commands.

Optionally, the first surface 15 of the housing 13 includes a pressure sensitive touchpad 18A with an auxiliary stylus 18B that can be used to enter data, commands and/or graphics items, including sketches by the radiotelephone user and more formal graphics, into the system. The touchpad 18A can be located adjacent to the keypad 17, between the keypad 17 and the display screen 19, or adjacent to the display screen 19, as desired.

The display screen 19 in FIG. 3 may be divided into two or more regions for different purposes. The display screen 19 can be made larger (10–20 lines, and preferably 14–20 lines, of alphanumeric or other data) in order to better accommodate display of text-intensive and/or graphics-intensive items. Optionally, the keypad 17 may be made longer as well, in the embodiment illustrated in FIG. 3.

A speaker 21, shown in FIG. 4, is preferably located at or near a: first end 25E1 of the second surface 25 of the housing 13. A microphone 23 is preferably located at or near a second end 25E2 of the second surface 25 of the housing 13. The speaker and microphone, 21 and 23, are preferably separated by a selected distance d that corresponds to a representative distance from mouth to ear for a radiotelephone user.

Figure 5:
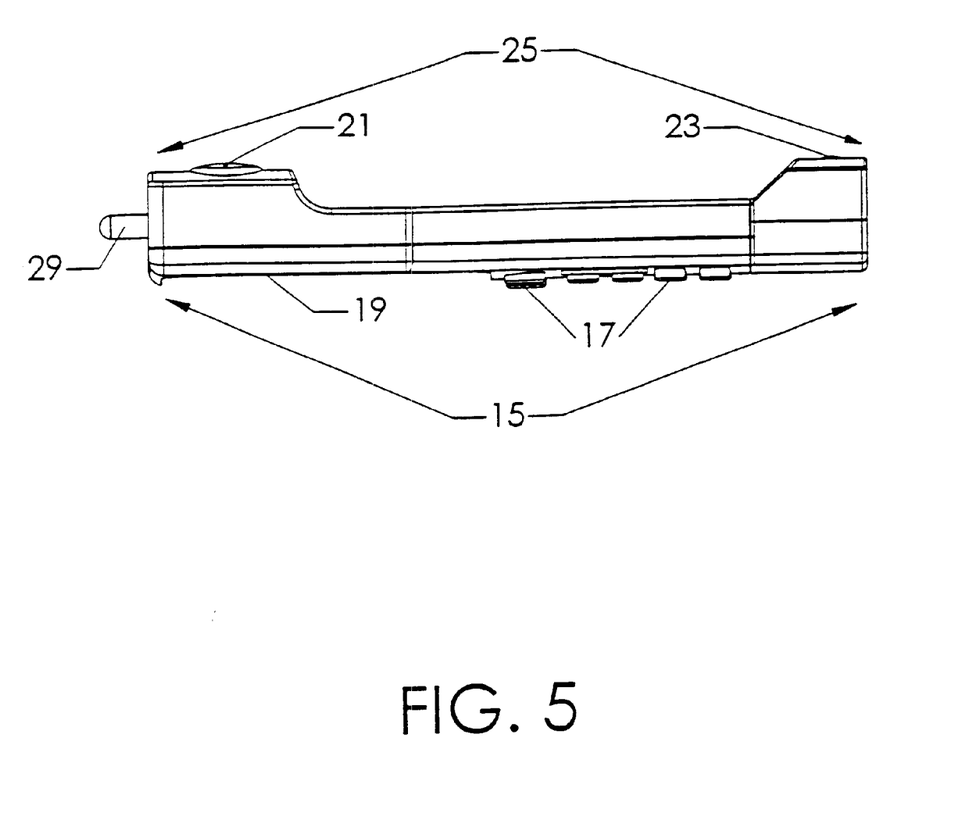
FIG. 5 is a side view of the device of FIGS. 2 and 3.
Figure 6:
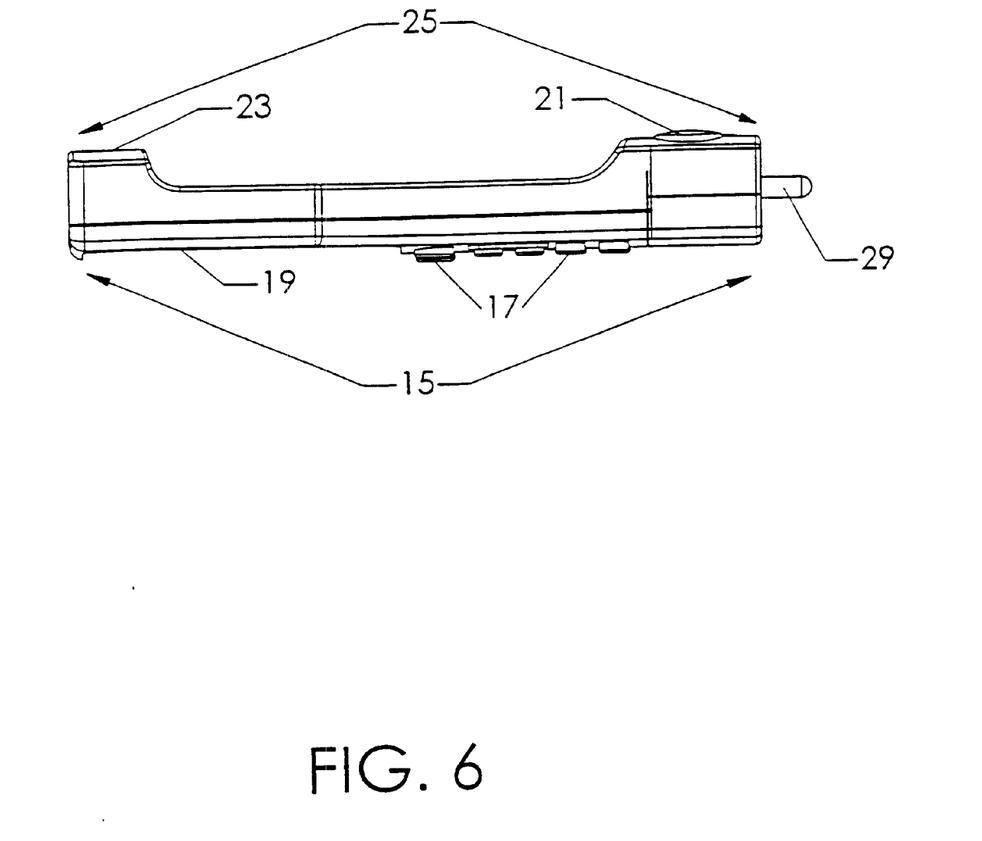
FIG. 6 illustrates a first face of another embodiment of the invention.

FIG. 5 is a side view of the embodiment shown in perspective in FIGS. 3 and 4, illustrating an option for this embodiment: one or both of the regions of the housing 13 that contain the speaker 21 and the microphone 23 can be made thicker to accommodate the electronic components used to provide these features and/or to receive one or more batteries or battery packs (referred to collectively as "batteries" herein). In FIG. 5, the microphone 23 and speaker 21 are located to the right of and above the keypad region 17 and to the left of and above the display screen 19, respectively. In an alternative embodiment, shown in side view in FIG. 6, the speaker 21 and the microphone 23 are located to the right of and above the keypad region 17 and to the left of and above the display screen 19, respectively.

Figure 7:
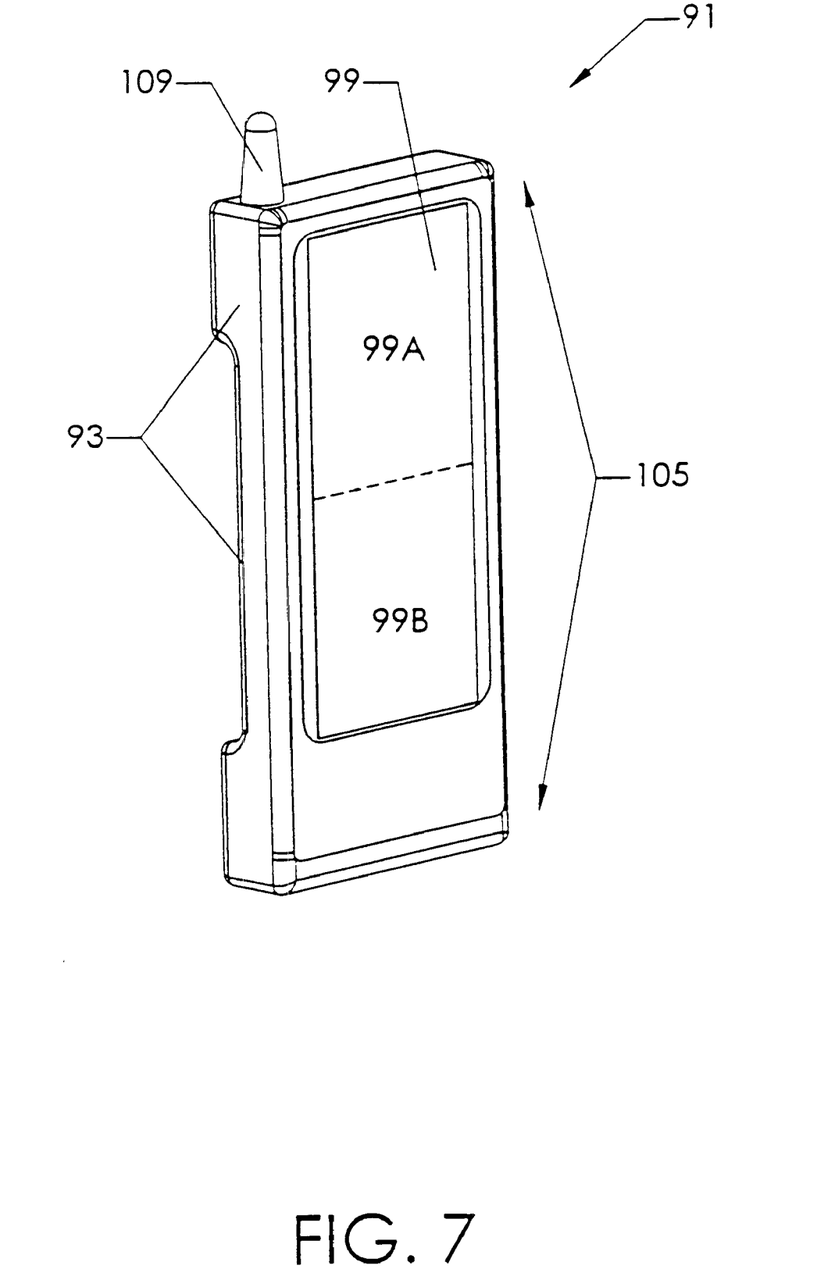
FIG. 7 is a perspective view of one surface of another embodiment.

FIG. 7 illustrates a first surface 105 of another embodiment 91, in which the separate keypad and display components are integrated into a larger, pressure sensitive display screen 99, having a display portion 99A and having an entry portion 99B that is used to enter commands and data for the device 91. A speaker and a microphone are separately located on a second surface (not shown) of the device 91, as in FIGS. 3–5. This embodiment permits use of a larger display screen 99 for data/command entry and for data display, through integrated use of most or all of the second surface for combined entry and display.

Figure 8:
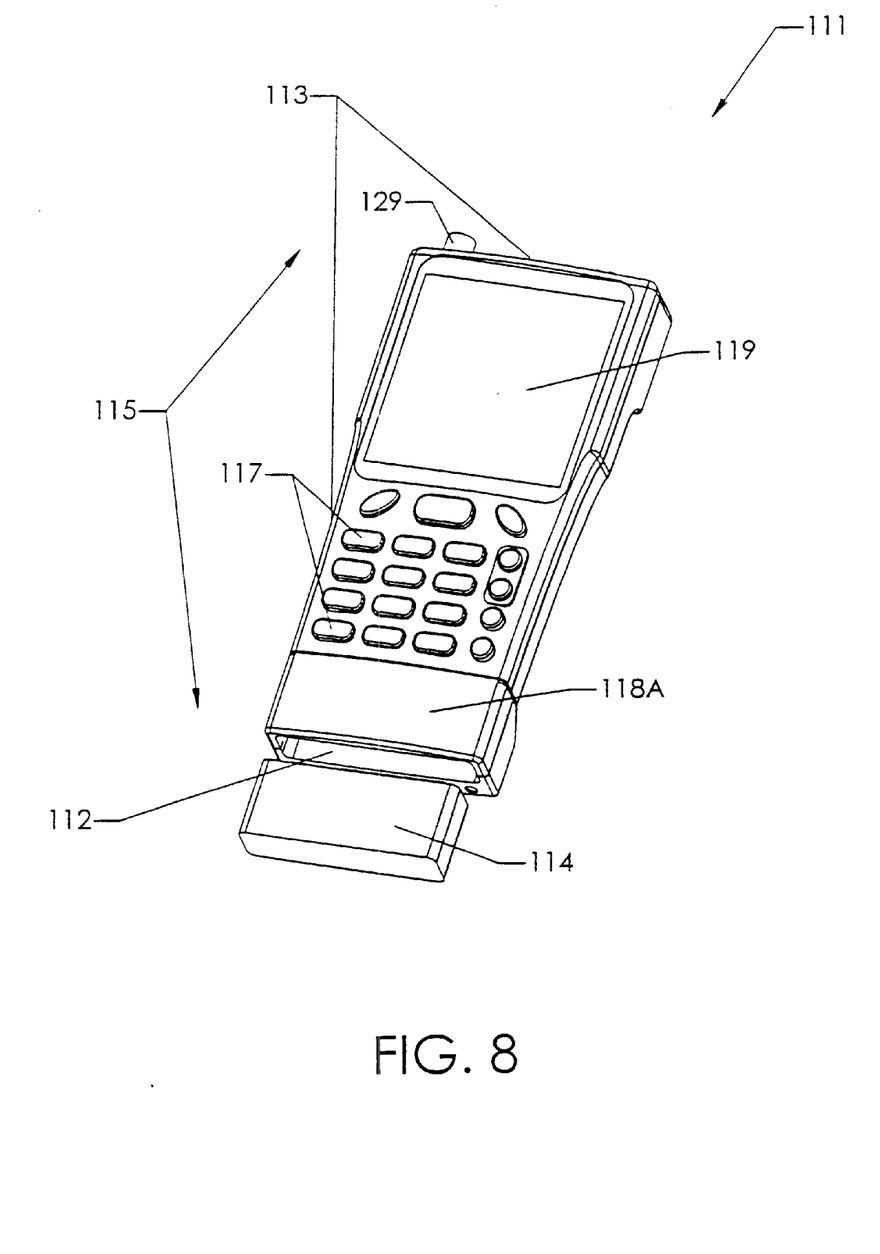
FIGS. 8–12 illustrate placement of a battery according to the invention.
Figure 9:
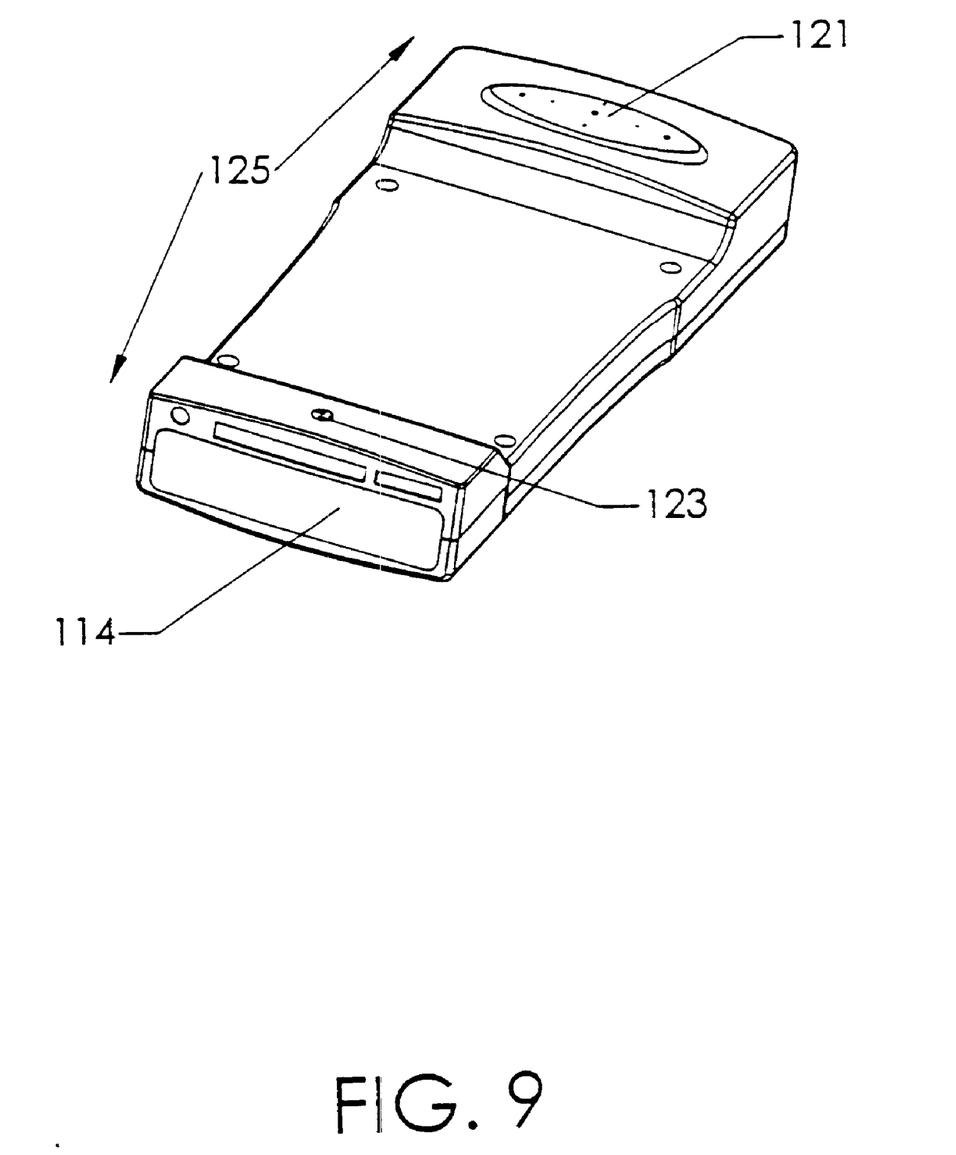

FIGS. 8–12 illustrate embodiments of the invention for placement of a battery. FIG. 8 illustrates a first surface 115 of a housing 113 of a radiotelephone 111, having a slot 112 on the bottom thereof that receives and holds a detachable battery 114 to provide electrical power for the radiotelephone. The first surface 115 includes a keypad 117, a display screen 119, an antenna 129 and an optional touchpad 118A for entry of text and/or graphics by hand into the system. FIG. 9 illustrates a second surface 125 of the radiotelephone 111 of FIG. 8, having a speaker 121 and a microphone 123 on the second surface and with the battery 114 in place.

Figure 10:
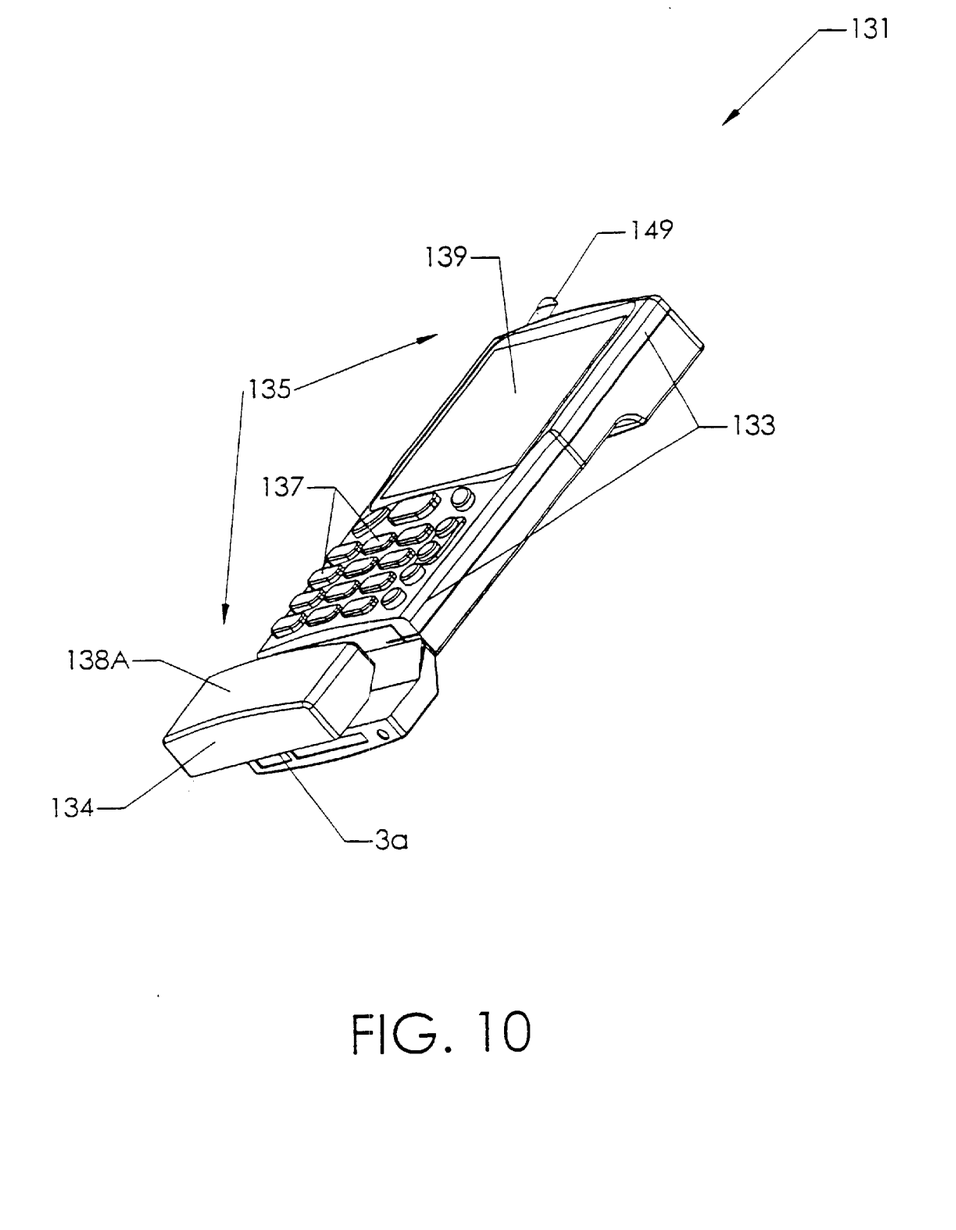

FIG. 10 illustrates a front surface 135 of a housing 133 of a radiotelephone 131 having a detachable battery 134, a keypad 137, a display screen 139 and an antenna 149 and having an optional touchpad 138A as part of the detachable battery 134. A second surface of the radiotelephone housing 133 has a speaker and a microphone (not shown), arranged as shown in FIGS. 3–7 and 9.

Figure 11:
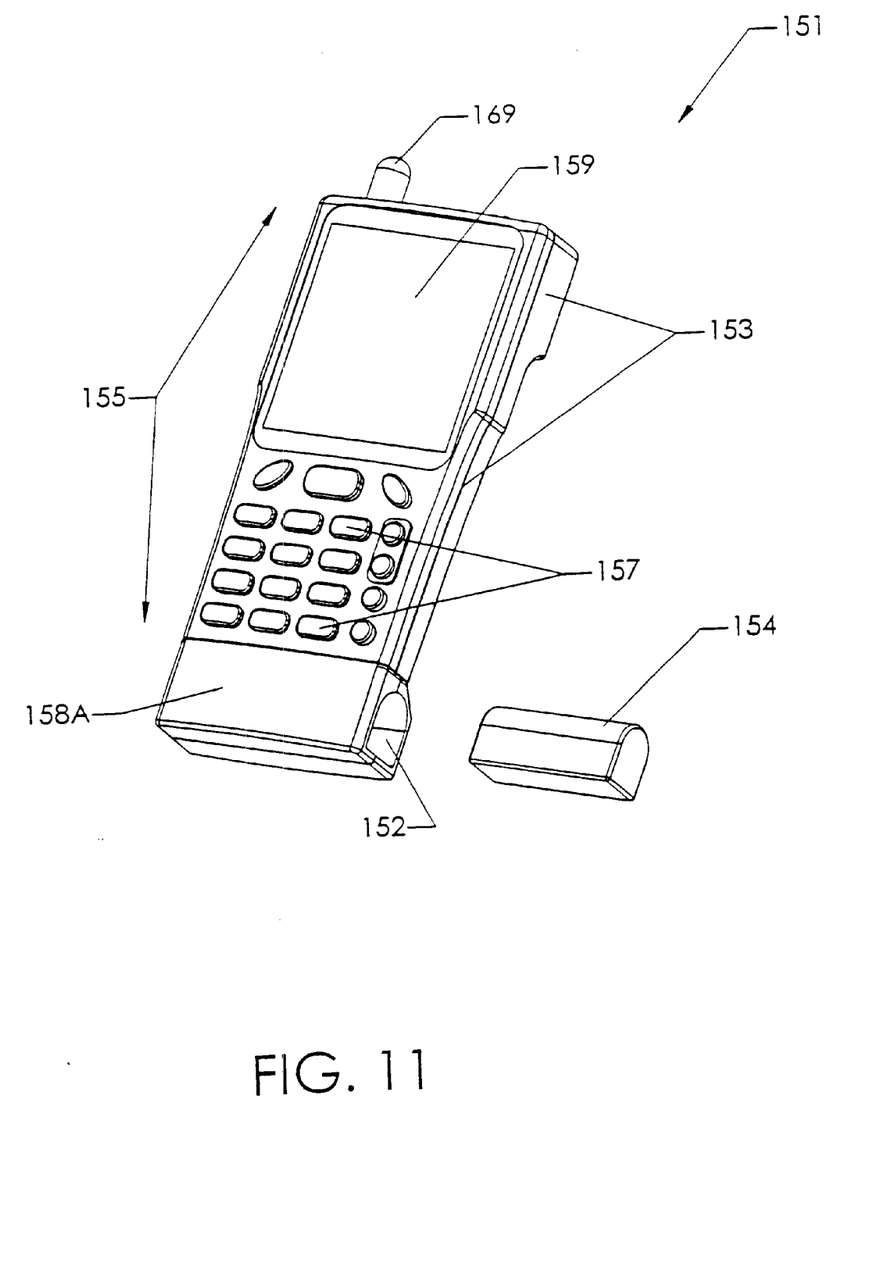

FIG. 11 illustrates a first surface 155 of a housing 153 of a radiotelephone 151 having a slot 152 on a side of the housing near the bottom thereof that receives and holds a detachable battery 154. The first surface 155 includes a keypad 157, a display screen 159, an antenna 169 and an optional touchpad 158A.

Figure 12:
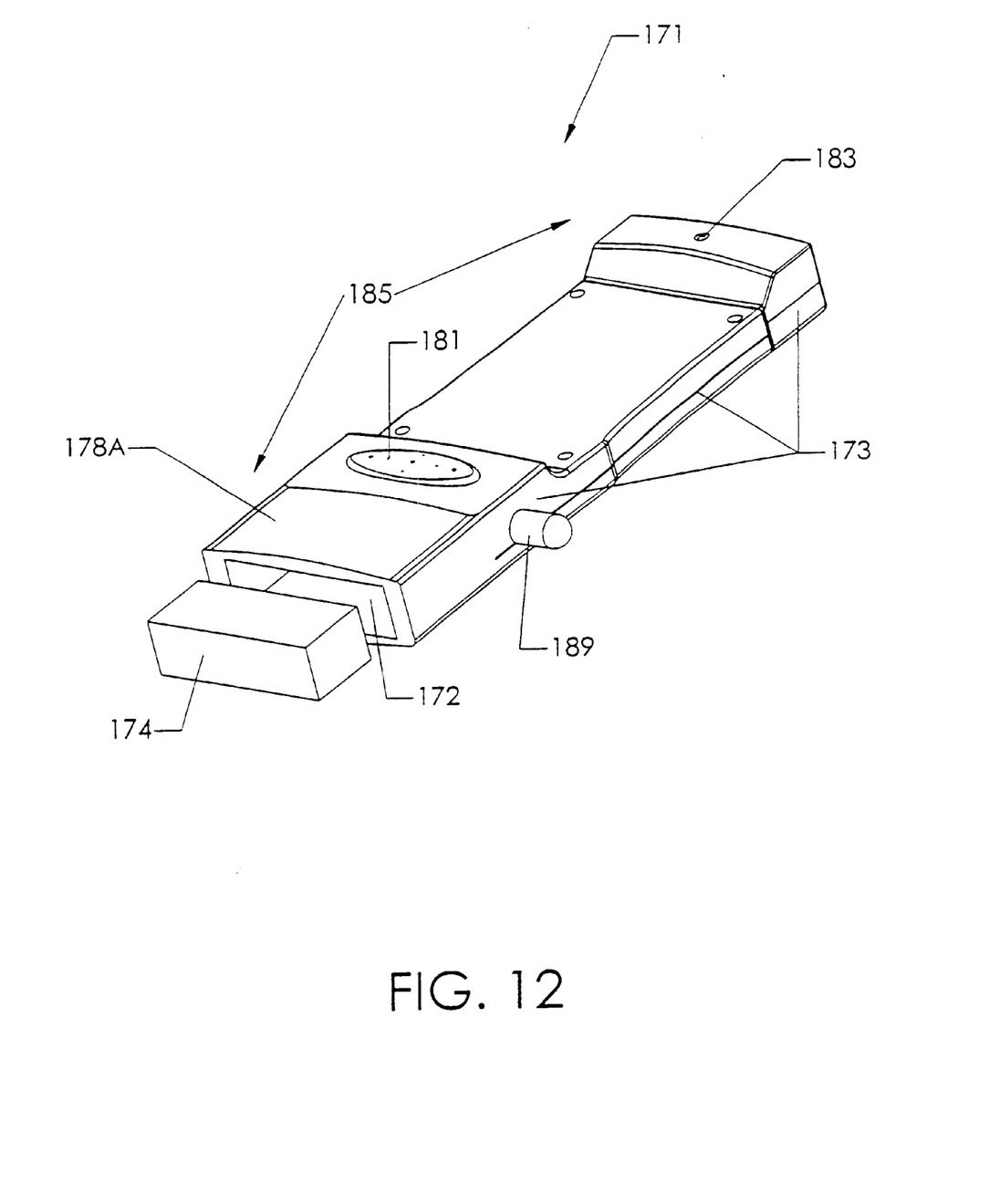

FIG. 12 illustrates a second surface 185 of a housing 173 of a radiotelephone 171 having a slot 172 on the top thereof that receives and holds a detachable battery 174 to provide electrical power for the radiotelephone. The second surface 185 includes a speaker 181, a microphone 183 and an antenna 189. The battery may be placed at or near the top of the radiotelephone housing in embodiments analogous to those shown in FIGS. 10 and 11.

The invention provides an improved battery-powered radiotelephone format in which a display screen can be enlarged and/or a pressure sensitive touchpad can be added to provide improved display of text-intensive and/or graphics-intensive items, and in which batteries can be relocated or re-oriented to preserve a general shape and general thickness of the device.

What is claimed is:

1. A handheld radiotelephone system comprising:
   a handheld housing having a first surface, a second surface and an antenna;
   a keypad that receives entry by a radiotelephone user of information including at least one of data and a command and stores the entered information in a radiotelephone memory unit;
   a display screen that displays selected data and selected commands, received from at least one of the radiotelephone user and the antenna, where the keypad and the display screen are located on the first housing surface;
   a memory unit associated with at least one of the keypad, the display screen and the antenna;
   a microphone that receives audio input signals from the radiotelephone user and transmits the input signals to at least one selected audio signal destination spaced apart from the radiotelephone system; and
   a speaker that receives audio signals the audio signal source spaced apart from the radiotelephone system, where the microphone and the speaker are spaced apart from each other on the second housing surface, and the display screen can display at least 10–20 lines of alphanumeric and graphical data,
   where the first housing surface has a first thickness associated with the keypad and the display screen that is smaller than a second thickness associated with at least: one of the speaker and the microphone.

2. The system of claim 1, further comprising a touch sensitive pad or touch sensitive screen, located adjacent to at least one of said keypad and said display screen, that receives and stores in said memory unit at least one of data, a command and a graphics item.

3. The system of claim 1, wherein said number of lines of said data displayed is at least 14–20 lines.

4. The system of claim 1, wherein said keypad comprises a selected region on said display screen where at least one of said data and said command is entered by depressing a selected ordered sequence of pressure sensitive keys displayed on said display screen.

5. A handheld radiotelephone system comprising:
 a handheld housing having a first surface, a second surface and an antenna;
 a keypad that receives entry by a radiotelephone user of information including at least one of data and a command and stores the entered information in a radiotelephone memory unit;
 a display screen that displays selected data and selected commands, received from at least one of the radiotelephone user and the antenna, where the keypad and the display screen are located on the first housing surface;
 a memory unit associated with at least one of the keypad, the display screen and the antenna;
 a microphone that receives audio input signals from the radiotelephone user and transmits the input signals to at least one selected audio signal destination spaced apart from the radiotelephone system;
 a speaker that receives audio signals from the audio signal source spaced apart from the radiotelephone system, where the microphone and the speaker are spaced apart from each other on the second housing surface, and the display screen can display at least 10–20 lines of alphanumeric and graphical data; and
 a battery that is attachable to, and detachable from, the housing adjacent to the microphone.

6. A handheld radiotelephone system comprising:
 a handheld housing having a first surface, a second surface and an antenna;
 a keypad that receives entry by a radiotelephone user of information including at least one of data and a command and stores the entered information in a radiotelephone memory unit;
 a display screen that displays selected data and selected commands, received from at least one of the radiotelephone user and the antenna, where the keypad and the display screen are located on the first housing surface;
 a memory unit associated with at least one of the keypad, the display screen and the antenna;
 a microphone that receives audio input signals from the radiotelephone user and transmits the input signals to at least one selected audio signal destination spaced apart from the radiotelephone system;
 a speaker that receives audio signals from the audio signal source spaced apart from the radiotelephone system, where the microphone and the speaker are spaced apart from each other on the second housing surface, and the display screen can display at least 10–20 lines of alphanumeric and graphical data; and
 a battery located adjacent to the microphone, where the battery is provided in at least one of two orientations:
  the battery is received and held in a slot that is reachable through a bottom surface of the housing; and
  the battery is received and held in a slot that is reachable in a side surface of the housing.

7. The system of claim 6, further comprising a touch sensitive pad or touch sensitive screen, located adjacent to said battery, for entering at least one of data, a command and graphics by hand into said system.

8. A handheld radiotelephone system comprising:
 a handheld housing having a first surface, a second surface and an antenna;
 a keypad that receives entry by a radiotelephone user of information including at least one of data and a command and stores the entered information in a radiotelephone memory unit;
 a display screen that displays selected data and selected commands received from at least one of the radiotelephone user and the antenna, where the keypad and the display screen are located on the first housing surface;
 a memory unit associated with at least one of the keypad, the display screen and the antenna;
 a microphone that receives audio input signals from the radiotelephone user and transmits the input signals to at least one selected audio signal destination spaced apart from the radiotelephone system;
 a speaker that receives audio signals from the audio signal source spaced apart from the radiotelephone system, where the microphone and the speaker are spaced apart from each other on the second housing surface, and the display screen can display at least 10-20 lines of alphanumeric and graphical data; and
 a battery that is attachable to, and detachable from, the housing adjacent to the speaker.

9. A handheld radiotelephone system comprising:
 a handheld housing having a first surface, a second surface and an antenna;
 a keypad that receives entry by a radiotelephone user of information including at least one of data and a command and stores the entered information in a radiotelephone memory unit;
 a display screen that displays selected data and selected commands, received from at least one of the radiotelephone user and the antenna, where the keypad and the display screen are located on the first housing surface;
 a memory unit associated with at least one of the keypad, the display screen and the antenna;
 a microphone that receives audio input signals from the radiotelephone user and transmits the input signals to at least one selected audio signal destination spaced apart from the radiotelephone system;
 a speaker that receives audio signals from the audio signal source spaced: apart from the radiotelephone system, where the microphone and the speaker are spaced apart from each other on the second housing surface, and the display screen can display at least 10–20 lines of alphanumeric and graphical data; and
 a battery located adjacent to the speaker, where the battery is provided in at least one of two orientations:
  the battery is received and held in a slot that is reachable through a top surface of the housing; and
  the battery is received and held in a slot that is reachable in a side surface of the housing.

10. The system of claim 9, further comprising a touch sensitive pad or touch sensitive screen, located adjacent to said battery, for entering at least one of data, a command and graphics by hand into said system.

* * * * *

UNITED STATES PATENT AND TRADEMARK OFFICE
CERTIFICATE OF CORRECTION

PATENT NO. : 6,708,021 B1  
DATED : March 16, 2004  
INVENTOR(S) : Jae H. Shim et al.

Page 1 of 1

It is certified that error appears in the above-identified patent and that said Letters Patent is hereby corrected as shown below:

<u>Title page,</u>  
*Primary Examiner*, should read -- Dwayne Bost --; and add  
-- *Assistant Examiner* — Joy Y. Contee --.

Signed and Sealed this

Twenty-first Day of September, 2004

JON W. DUDAS  
*Director of the United States Patent and Trademark Office*